(12) United States Patent
Hognaland

(10) Patent No.: US 6,654,662 B1
(45) Date of Patent: Nov. 25, 2003

(54) METHOD FOR ORGANIZING THE STORAGE OF DIFFERENT UNITS

(75) Inventor: Ingvar Hognaland, Nedre Vats (NO)

(73) Assignee: Autostore AS (NO)

(*) Notice: Subject to any disclaimer, the term of this patent is extended or adjusted under 35 U.S.C. 154(b) by 0 days.

(21) Appl. No.: 09/355,463
(22) PCT Filed: Apr. 30, 1998
(86) PCT No.: PCT/NO98/00136
§ 371 (c)(1), (2), (4) Date: Jul. 29, 1999
(87) PCT Pub. No.: WO98/49075
PCT Pub. Date: Nov. 5, 1998

(30) Foreign Application Priority Data

Apr. 30, 1997 (NO) .................................................. 972004

(51) Int. Cl.⁷ ................................................ G06F 7/00
(52) U.S. Cl. ..................... 700/214; 700/216; 700/228; 700/217
(58) Field of Search ................................. 700/230, 228, 700/227, 215, 216, 217, 218, 281; 414/933, 796.9, 792, 796.2

(56) References Cited

U.S. PATENT DOCUMENTS

| | | | | |
|---|---|---|---|---|
| 4,149,452 A | * | 4/1979 | Talarico | 93/51 |
| 4,287,459 A | * | 9/1981 | Dahlstrom | 318/568 |
| 5,147,176 A | | 9/1992 | Stolzer et al. | |
| 5,190,427 A | | 3/1993 | Lai | |
| 5,340,262 A | | 8/1994 | Tsujimoto et al. | |
| 5,472,309 A | * | 12/1995 | Bernard, II et al. | 414/786 |
| 5,609,460 A | * | 3/1997 | Abel et al. | 414/334 |
| 5,664,928 A | * | 9/1997 | Stauber | 414/269 |
| 5,799,495 A | * | 9/1998 | Gast, Jr. et al. | 62/78 |
| 5,803,280 A | * | 9/1998 | Mende et al. | 212/330 |
| 5,844,806 A | * | 12/1998 | Shibano | 364/478 |
| 5,934,413 A | * | 8/1999 | Konig et al. | 186/56 |
| 5,985,214 A | * | 11/1999 | Stylli et al. | 422/65 |
| 5,996,316 A | * | 12/1999 | Kirschner | 53/443 |
| 6,055,462 A | * | 4/2000 | Sato | 700/217 |
| 6,061,607 A | * | 5/2000 | Bradley et al. | 700/216 |
| 6,275,743 B1 | * | 8/2001 | Kondo et al. | 700/214 |

FOREIGN PATENT DOCUMENTS

| | | |
|---|---|---|
| DE | 2629718 A1 | 1/1978 |
| DE | 4133218 | 4/1993 |
| EP | 0217757 B1 | 4/1987 |
| EP | 0767113 A2 | 4/1997 |
| NO | 163276 | 2/1986 |

* cited by examiner

*Primary Examiner*—Donald P. Walsh
*Assistant Examiner*—Michael E. Butler
(74) *Attorney, Agent, or Firm*—Patterson, Thuente, Skaar & Christensen, P.A.

(57) ABSTRACT

The invention concerns a method for organising the flow of goods for a stock consisting of heterogeneous units arranged closely on top of and beside one another in stacked standardised parallelepiped-shaped containers (1) which are joined into several co-ordinate-forming layers of containers in a vertical framework (6). With one or more computer-controlled lifting devices (5) with a gripping device (3) each individual container is lifted mechanically up and out of the stack for manual replenishment or a manual packing station (7). After dispatch the container (1) is returned to a new random, but continuously known position. The random and continuous alteration of location compels the statistically most frequently sold goods to be located in containers which have recently been returned to the upper layer of the stack, while those goods which statistically are seldom sold over a period of time will be located in containers in the lower layers of the stack.

5 Claims, 6 Drawing Sheets

METHOD FOR ORGANIZING THE STORAGE OF DIFFERENT UNITS

The invention concerns a method for organising the flow of goods for a horizontally layered and deep-stacked stock of goods with heterogeneous units, together with equipment for transfer and continuous registration of standardised containers used in the implementation of the invention.

In a trade organisation which purchases a multiplicity of units of heterogeneous form, size and weight for storage and sells different types and numbers of units from this store to customers, a methodical organisation of the location of the units in the store is required in order to facilitate the flow of goods.

This is necessary in order to be able to keep a stock adapted to sales, so that the number of the individual units in the stock is adapted to suit the expected sales.

Furthermore, it is desirable that the goods should be placed within physically easy access in order to facilitate selection, and so that rolling of the stock can be implemented.

Some stores collect the most sold goods in groups near packing tables and the like in order to reduce internal movement.

With the steady increase in the use of data technology each individual item is monitored, with the result that the physical location will be determined and altered with every new consignment which is purchased.

Moreover, each individual unit can be marked with bar codes which are read mechanically for retrieval and checking, both during dispatch and inventory and during the customer's receipt check.

Retrieval is normally conducted by staff moving through the store's network of access passageways with, e.g., trucks or collecting vehicles. On the basis of selection lists, based on customer orders, and which are edited according to the position of the different units in the store, the units are then collected which form part of the individual order for packing and dispatch.

Various forms of automation of such stores, especially for retrieval of units from such a store, are previously known. U.S. Pat. No. 5,147,176 discloses such an automated storage system where units are given a random location, and where a computer program keeps continuous track of the position of the individual units. This system further comprises storage shelves where the stored units are placed in boxes. Between the storage shelves there are access passages, and cranes or hoist devices transfer the storage boxes to vehicles which transport them to a packing station or the like.

Another example is described in EP 767 113, which discloses a robot system for locating or removing units to and from a store. The units are stacked vertically, and the robot has a gripping device which can lift units vertically to remove them from the stack.

U.S. Pat. No. 5,340,262 describes a data based storage system which utilizes bar code marking of ingoing goods which are placed in standard pallet storage shelves, without the goods being related to their physical location.

EP 0 217 757 describes an automatic transfer device for goods from a storage place to a handling place.

NO 163276 describes sorting and holding store equipment for goods which are continuously coming from production in a bakery and which have to be packed in boxes according to individual customer orders, standard boxes being sequentially transferred from each packing station via customer stations to delivery stations.

Production and trading companies often have substantial storage space requirements, and it is essential to be able to make the most effective use possible of available space. The object of the present invention is to provide a utilization of space which far surpasses that which is achieved according to the previously known solutions, both with regard to exploitation of floor area and vertical stacking. Furthermore it is in an object to provide a highly effective facility for access to stored goods together with rolling of stored goods.

An organisation's storage requirements are closely associated with the requirements for accessibility.

Direct physical access to the individual and oldest unit in stock is necessary and crucial for an effective handling and rolling of the units in the stock, and this normally has to be considered when introducing new units and, for example, selection when dispatching orders.

Heterogeneous units cannot normally be deep-stacked, i.e. stacked on top of one another or close to one another in the same shelf or on the same pallet. Sufficient space must therefore be allocated in the individual shelf to the number of units which will be present when the store is full. If maximum stock requires space for a pallet with, e.g., 48 units of a given unit-which, for example, may correspond to one month's sale- and order estimates are based on the assumption that new goods will arrive, e.g., ten days before an empty or sold-out situation arises, together with the fact that a purchase unit is a whole pallet, two pallet places must be allocated in the store.

Other factors which create space requirements are the staffs need for physical access to the individual and first-incoming item. Through-going access passageways must be laid out for trucks, parcel trolleys and the like, and these often also have to be allowed two-way traffic, which more than doubles the width of the access ways.

Calculations of actual volume utilization for modern wholesale stores where the staff require access to the stored units show a utilization factor of only 15–20%.

When developing a traditional store of this kind, only raw goods producers and some industrial stores with a small number of types of goods and relatively few but major deliveries to a small number of customers can afford to deep-stack, i.e. to stack homogeneous articles on top of one another and close to one another in a collective stack. A store of this kind provides a greater utilization factor, but no access to the individual item.

The necessary requirement for stock organisation and the above-mentioned and further objects are achieved by means of a method which is characterized by what is stated in the claims.

A detailed description will now be given of the present invention with reference to the appended drawings.

Figure 1:
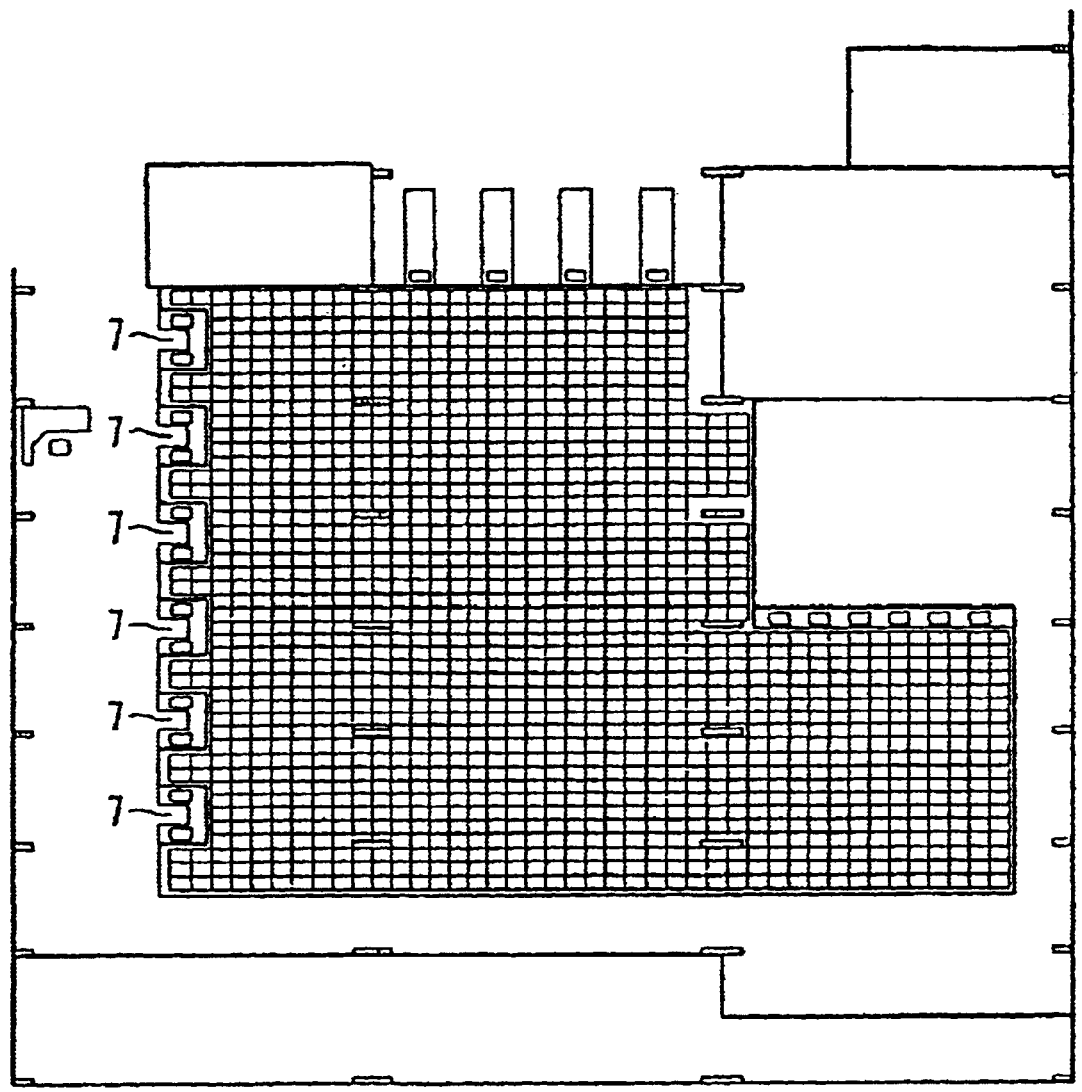
FIG. 1 shows a possible layout for a store which employs the present invention.

The present invention for organisation of goods flow for a stock of goods of heterogeneous units is based, as shown in the example in FIG. 1, on a thoroughly compact assembly of standardised containers in a vertical framework. The various stored units are placed in these standardised containers.

Figure 4:
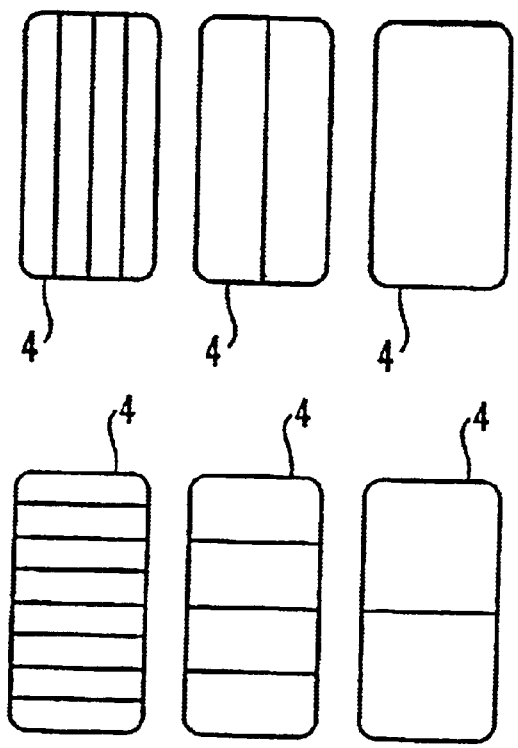
FIG. 4 shows the possible division of a container as illustrated in FIG. 3 into several compartments.

A container's standard dimensions for a given store is calculated on the basis of the individual units' maximum size, and the containers can be sectioned as illustrated in FIG. 4, by dividing the container into several compartments by means of one or more longitudinal or transverse partitions.

An essential condition will be that the various units which have to be placed in the store do not vary too much in size. As a practical example, reference may be made to a store for electronic components or the like. In this case it will be possible to include 99% of an assortment of approximately 50,000 variants distributed between 12,000 containers which are 70 cm long, 40 cm wide and 25 cm high.

In order for such a stock to be contained in a traditional store in a satisfactory manner with regard to accessibility and operating efficiency, there is an estimated requirement for 4800 m$^2$ of storage surface for fitting out with shelves and access passageways.

By employing the present invention a storage area of 420 m$^2$ will cover the same requirement. With 60 containers in length, 25 containers in width and 8 containers in height, the required 12,000 containers can be placed in a store with a floor surface of 42 m×10 m, and stacked in 2 m heights. (60×0.7 m=42 m, 25×0.4 m=10 m, 8×0.25 m=2 m). This gives a total volume of 820 m$^3$.

In this example the store is served from seven packing stations, six receiver stations and with up to four shipping stations.

Figure 2:
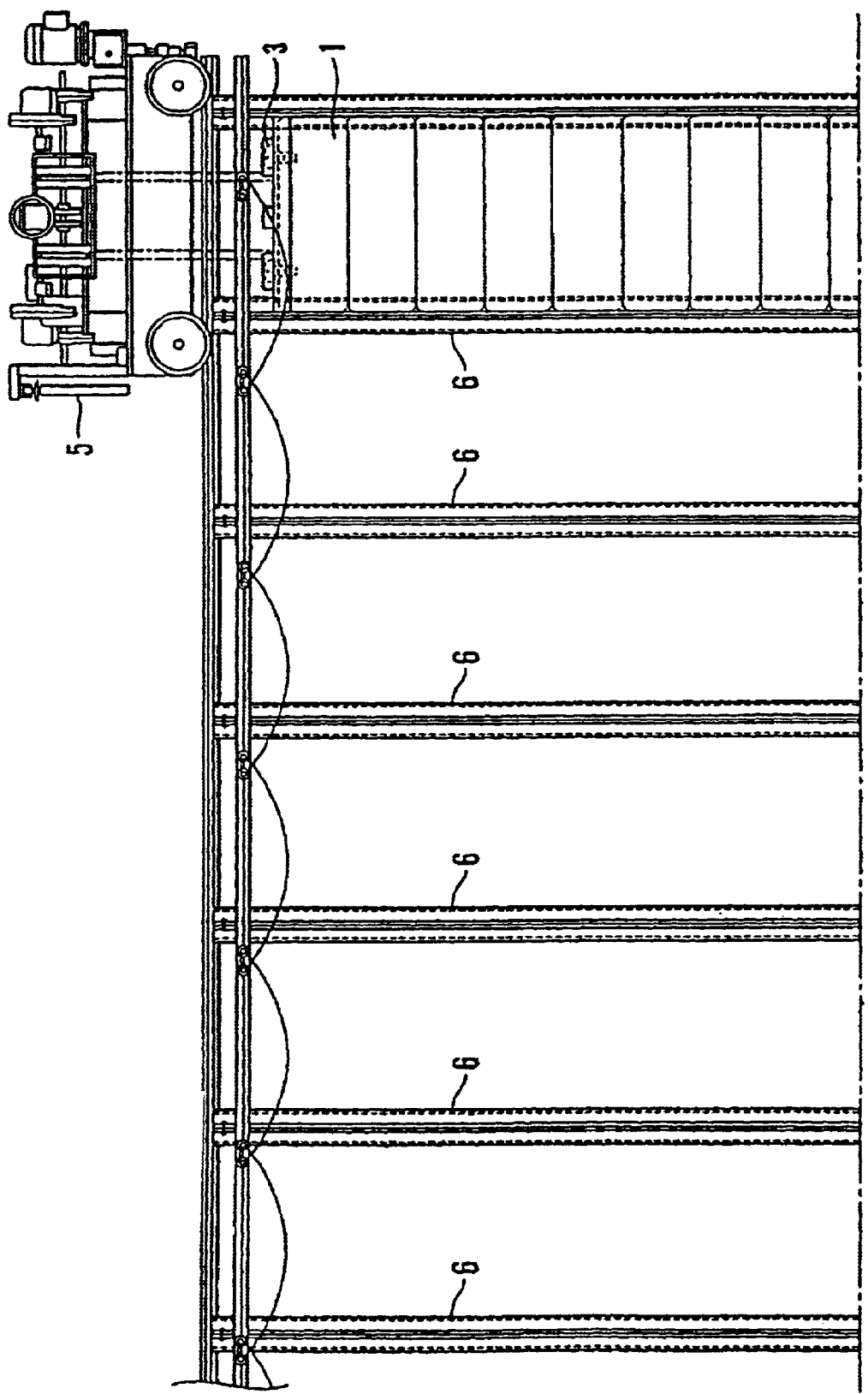
FIG. 2 and FIG. 2a are a side view of a part of a store as illustrated in FIG. 1, with a possible design of a lifting device.
Figure 2A:
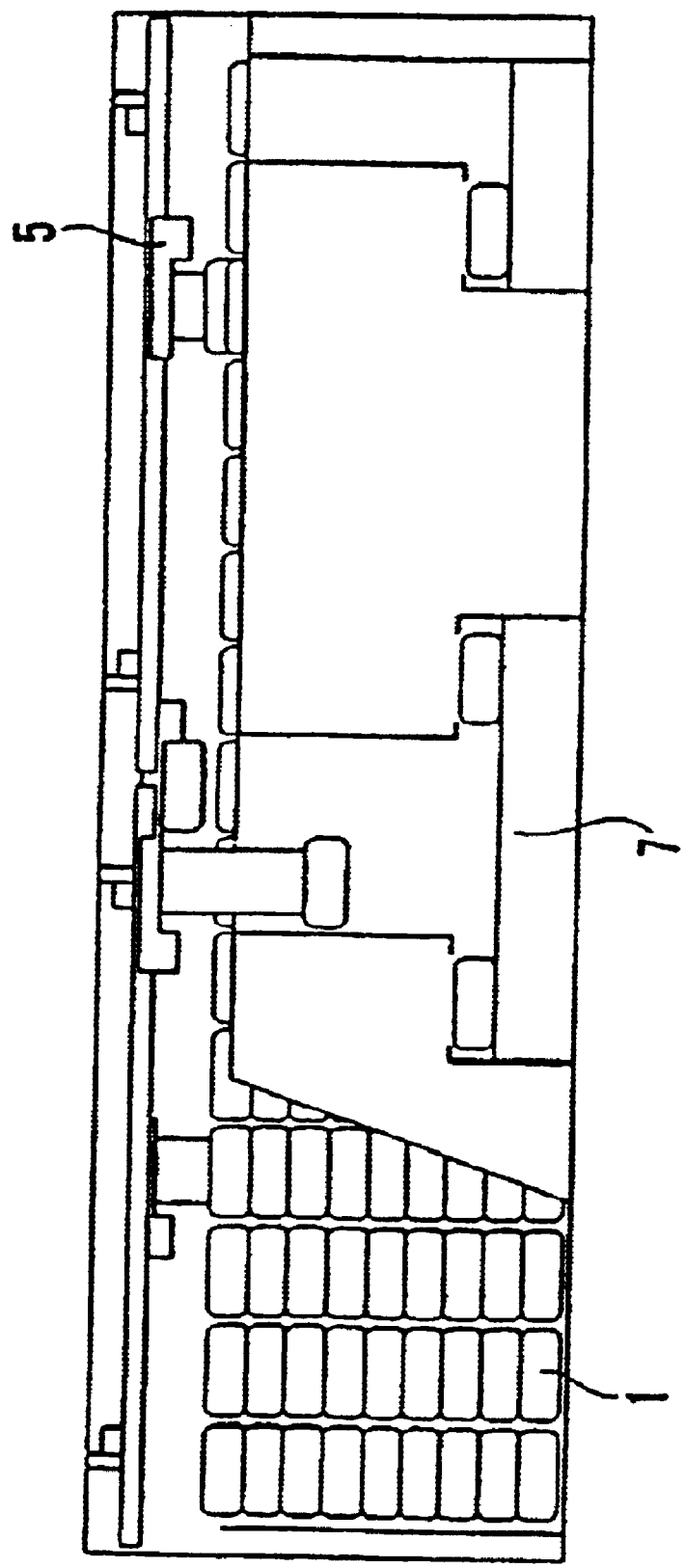

The above example, therefore, is illustrated in FIG. 1, while FIG. 2 illustrates the store viewed from the side. In FIG. 2 there is also shown a possible design of a lifting device 5 together with a framework 6 which separates the respective stacks of containers from one another, thus giving a highly compact storage of units. The features which ensure an effective access to the stored goods will now be described.

The lifting devices 5 may be composed of travelling cranes, carriages which move on a rail system on top of the store and which are equipped with crane devices, or any form of crane which provides direct access to the individual stacks in the store from the top. The practical design of the lifting devices 5 is not a part of this invention and as an embodiment we have chosen to employ a crane device.

Figure 3:
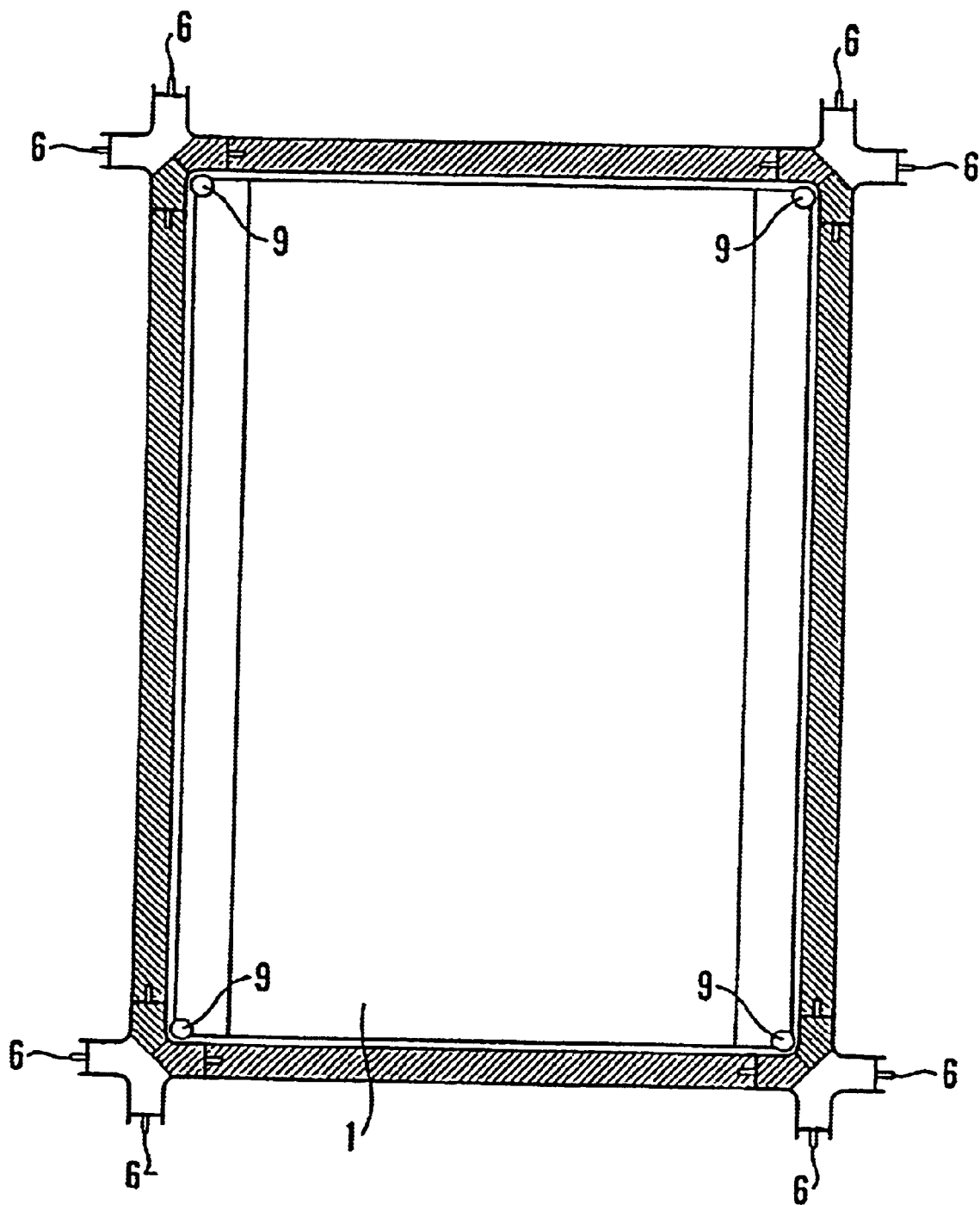
FIG. 3 shows a container for stored units together with a frame for control of such containers, all viewed from above.
Figure 5:
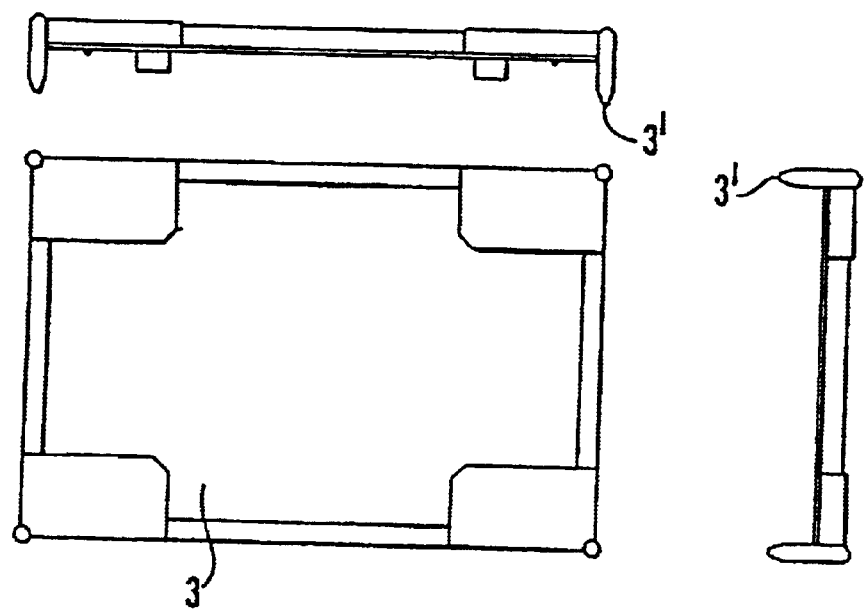
FIG. 5 illustrates a hoist claw board for gripping and lifting containers like that illustrated in FIG. 3.

We now refer to FIG. 3. All the containers 1 are of the same design and dimensions, preferably in the form of a parallelepiped. The containers 1 will normally be designed without a lid and with a number of grooves 9 for insertion and attachment of a gripping device. Such a gripping device is illustrated in FIG. 5. The containers may advantageously be equipped with slide-forming vertical grooves on their four outer vertical sides in order to reduce the contact surface against the vertical framework 6 and thereby the friction, when they are brought into vertical movement up and out of engagement with the framework 6.

As illustrated in FIG. 4 the containers 1 may be sectioned by a number of longitudinal or transverse partitions, thus forming a plurality of compartments. This will prevent units which are stored in such small amounts that they do not require a whole container from taking up an unnecessary amount of space.

The containers are transferred by bringing a lifting device 5 which includes a gripping device 3 into a position where it has access to a stack of containers from the top.

A possible design of the gripping device 3 is indicated in FIG. 5. It is in the form of a board with at least two gripping fingers 3' which can engage with the container 1. When a gripping device of this design is in engagement with a container, it will form a lid which prevents the units which are stored in the container from falling out during transfer.

Figure 6:
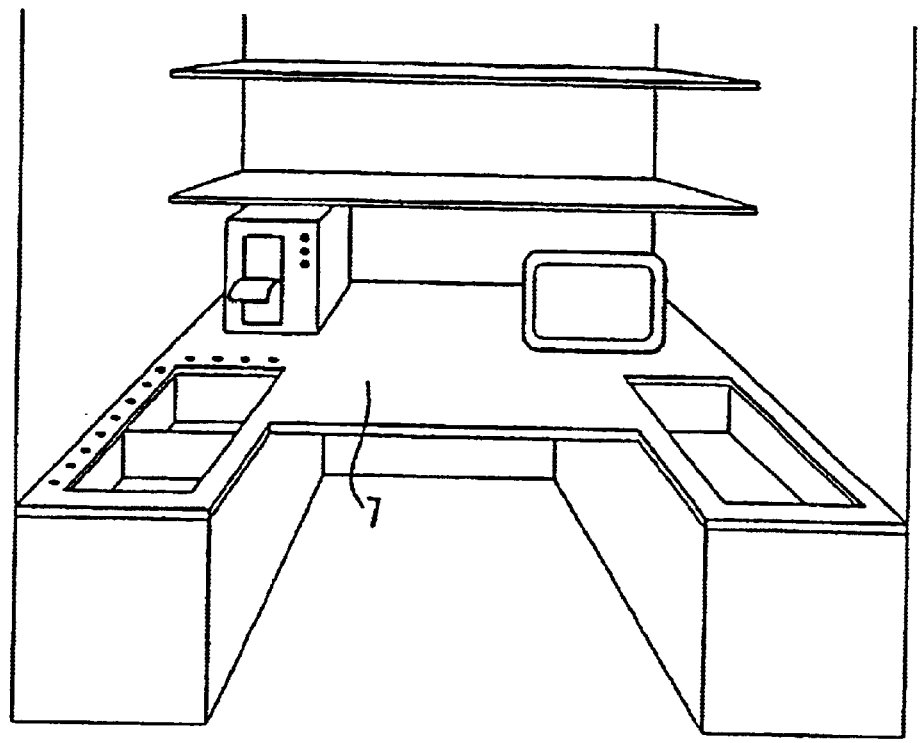
FIG. 6 illustrates a possible embodiment of a packing station for units which are removed from a store which employs the present invention.
Figure 7:
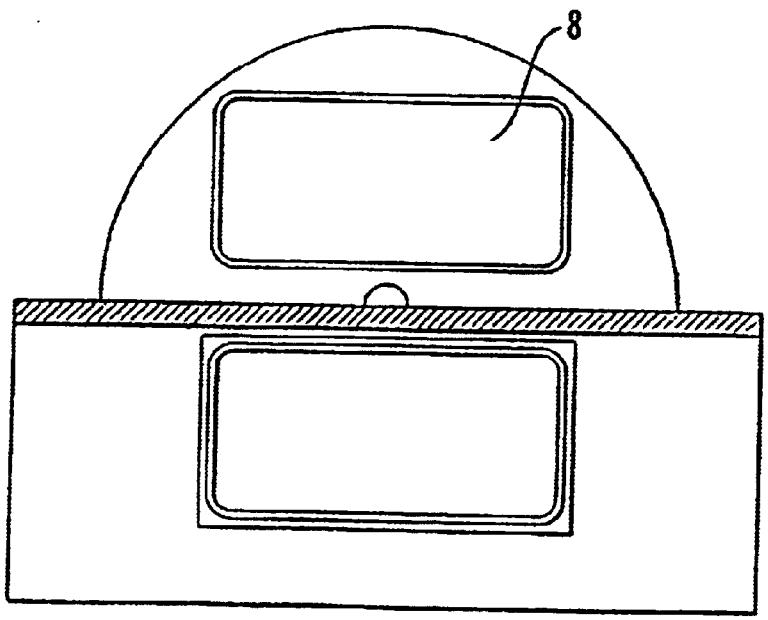
FIG. 7 illustrates a detail of the packing station in FIG. 6.

In order to gain access to a given container 1 in the stack, the containers are lifted out from the top one by one, placed in temporary positions, for example on top of other stacks in the immediate vicinity, until the desired container has been lifted out of the stack. The desired container is placed temporarily in the same manner as the containers which were placed above it, while these other containers are replaced in the store, preferably in the same stack and so that they are in the same order in relation to one another. The desired container 1 is then conveyed by the lifting device 5 from its temporary position out of the store, for example to a packing station 7. A possible design of such a packing station is illustrated in the FIGS. 6 and 7.

After the units concerned have been removed from the container 1, it is returned to the store by one of the lifting devices 5.

Each individual container 5 and each individual compartment 4 in each container is given a reference number. This reference number is used by a computer system to keep track of the location of each container 1 at any given time, and in which compartment in which container a given unit is located at any time. Every time a container 1 is brought out of the store, this is recorded in the computer system. Each container 1 will therefore always be recorded as being located in a given position in the actual store, in a given intermediate storage station, in a given lifting device 5 or at a given packing station 7. If the system also comprises receiving stations and shipping stations, it will also be possible for such positions to be recorded by the computer system. In short, each localisation of each container at any time will be defined and recorded in the computer system. In the actual store such a position will comprise horizontal co-ordinates and vertical height in the framework 6.

When a container 1 is placed into the store, either after replenishment of units which are added to the store or when the container is returned from a packing station 7, it may be placed anywhere in the store. The position will be recorded in the computer system, and the container can therefore be placed in the first available vacant space.

In most stores which include a plurality of different stored units, some units will be sold more often than others. It is therefore desirable to place containers which contain units which are often in demand near the top of a given stack, and preferably also near the packing stations 7. This will reduce the retrieval time for the store in general.

This will be performed automatically by means of the method which is described above, the containers which are often retrieved being placed on the top of a stack when they are returned, while the containers which are seldom retrieved will sink to the bottom of the stack every time a lower-lying container is removed and returned to the top of the stack.

By considering the example which has already been discussed, where around 80% of the sales stands to the account of 20% of the number of variants, it is shown to be desirable that these most sold variants should be located in or near the top layer at any time in order to reduce the retrieval time.

Data simulation performed through three months of the orders shows that in a horizontal 9-layer store, dispatches on this basis will be conducted as follows:

33% from the stack surface's top layer, 14% from the second layer and 11% from the third layer, or altogether 58% from the three top layers. Since orders which come in in the course of a day can be systematised into an envisaged total order, a rearrangement of the retrieval of the store's containers can be carried out during the night, with the result that all the containers required for the next day's dispatch are brought up to the top, or the second top layer, thus enabling the transfer of containers to the packing station to be performed at maximum speed.

Ingoing goods to the store are filled in separate, new chambers 4 in a container 1, with the result that each individual ingoing consignment according to,the list of contents is always equipped with the supplier's receipt number as identification. Thus the same type of article, but with a different receipt date, can be found in several chambers 4.

Consecutive dispatches from the store entail a countdown total of the individual chamber contents, and a check is made of the final sale as a chamber is emptied.

The individual item is marked with a bar code for a separate final check during dispatch and invoicing, and in order to facilitate the customer's receipt check.

Interesting safety details are built into a system of this kind as described:

No container will disappear out of the system. They always have to be returned. It will only be possible to remove a container when there is an existing order.

A highly concentrated and homogeneous path for the container's travel from storage stack to picking station will provide a very short retrieval time without travelling staff.

Container transfer takes place in a built-in store and is therefore quiet and completely screened, thus eliminating clamping damage.

Audits of the stock are made possible by means of separate test program runs.

An inert atmosphere, e.g. completely dry air or nitrogen, may be introduced into the store in order to prevent corrosion. This will be possible since the actual storage space can be kept to a minimum size, i.e. the space is filled to the maximum extent with the actual stock with associated equipment, and since it is not necessary for the store staff to have physical access to the store. The extent of the air volume is therefore relatively small.

The invention is not limited to the illustrated embodiment, and many modifications are possible within the scope of the invention. Other types of gripping and lifting devices, for example, may therefore be employed than those which are illustrated, such as carriages on rails instead of crane devices.

What is claimed is:

1. A system of organization with respect to location and flow of goods for a stock of heterogeneous units in a store having a plurality of stacks of standardized containers, comprising:

a vertical framework to store a plurality of stacks of standardized containers, wherein the framework is accessible from the top;

a plurality of standardized parallelepiped-shaped containers having four outer vertical sides and adapted to the physical dimensions of the units for storing the units therein, the containers being arranged in horizontal layers and deep-stacked and stock joined in the vertical framework, thereby forming several horizontal co-ordinate forming layers of containers whose positions at any time are random;

a computer system to continuously monitor and record the positions of the containers;

at least one lifting device including a gripping device, wherein the lifting device has access to the framework from the top of the framework, wherein a lifting device is moved to a position above a stack having the same horizontal co-ordinate as the horizontal co-ordinate recorded in the computer system for a desired container; wherein the lifting device is used to grip and hoist a top most container from the stack, wherein the top most container that is not the desired container is moved to a temporary position, wherein the lifting device continues to move containers from the stack to temporary positions until the gripping device grips the desired container, wherein the lifting device is used to move the desired container to a predetermined location, wherein the containers moved to temporary positions are returned back to the stack so that their relative order is retained, and wherein the desired container is returned to a top of a stack;

whereby to minimize retrieval and delivery time of desired containers between the store and the predetermined location, requests for containers from the store during a given period of time are input together into the computer system so that prior to the given period, the containers in each stack are arranged so that a container to be retrieved more frequently than another container during the given period is placed higher in each respective stack.

2. The system according to claim 1, wherein the containers are divided into different compartments according to their purpose.

3. The system according to claim 1, wherein the at least one gripping device is constructed and arranged in the form of a board with gripping fingers, and wherein each container has corresponding grooves arranged for being gripped by the gripping fingers, so that when the gripping device engages a container, the board forms a lid over the container.

4. The system according to claim 1, wherein outer vertical sides of the containers have slide-forming vertical grooves to control movement and reduce friction and surface contact against the vertical framework when the containers are moved vertically within the framework.

5. A system of organization with respect to location and flow of goods for a stock of heterogeneous units in a store having a plurality of stacks of standardized containers, comprising:

a vertical framework to store a plurality of stacks of standardized containers, wherein the framework is accessible from the top;

a plurality of standardized parallelepiped-shaped containers having four outer vertical sides an adapted to the physical dimensions of the units for storing the units therein, the containers being arranged in horizontal layers and deep-stacked and stock joined in the vertical framework, thereby forming several horizontal co-ordinate forming layers of containers whose positions at any time are random;

a computer system to continuously monitor and record the positions of the containers;

at least one lifting device including a gripping device, wherein the lifting device has access to the framework from the top of the framework, wherein a lifting device is moved to a position above a stack having the same horizontal co-ordinate as the horizontal co-ordinate recorded in the computer system for a desired container; wherein the lifting device is used to grip and hoist a top most container from the stack, wherein the top most container that is not the desired container is moved to a temporary position, wherein the lifting device continues to move containers from the stack to temporary positions until the gripping device grips the desired container, wherein the lifting device is used to move the desired container to a predetermined location, wherein the containers moved to temporary positions are returned back to the stack so that their relative order is retained, and wherein the desired container is returned to a top of a stack;

wherein an inert atmosphere is introduced into the store.

* * * * *